May 1, 1945.   J. A. BOMBARDIER   2,374,644
SPROCKET WHEEL
Filed July 10, 1943
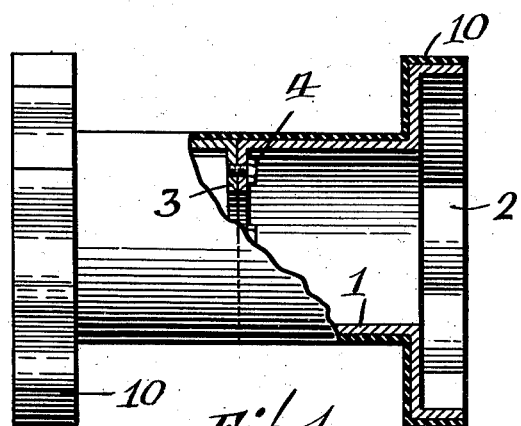
Fig.1
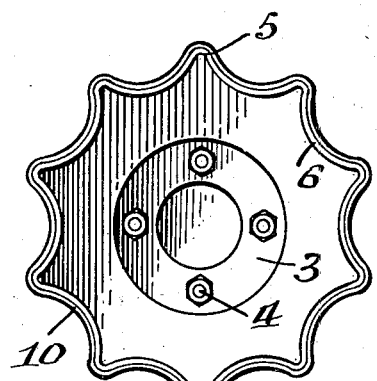
Fig.2
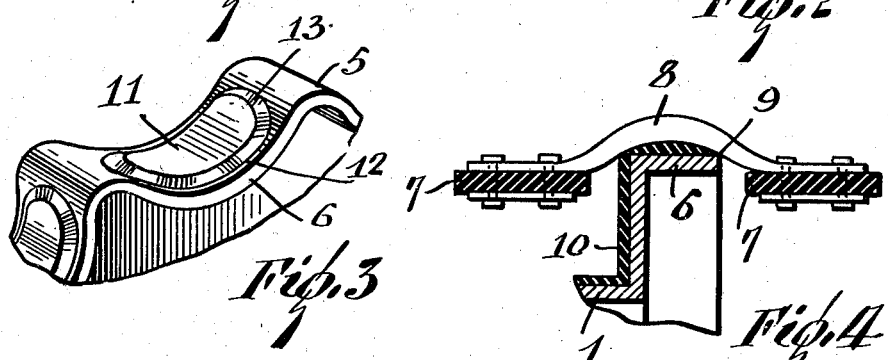
Fig.3
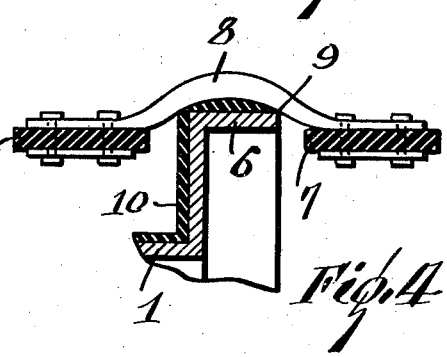
Fig.4
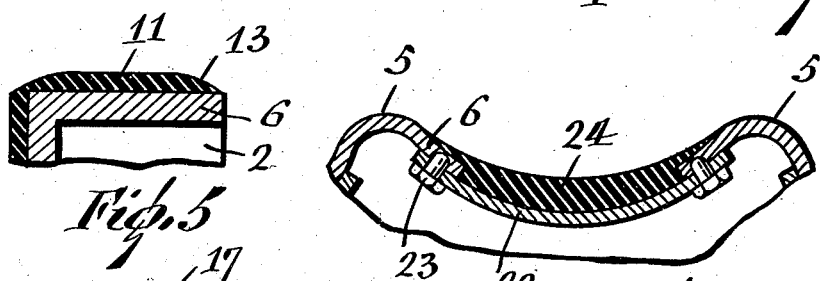
Fig.5
Fig.8
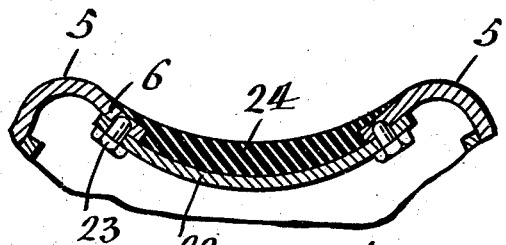
Fig.6
Fig.7
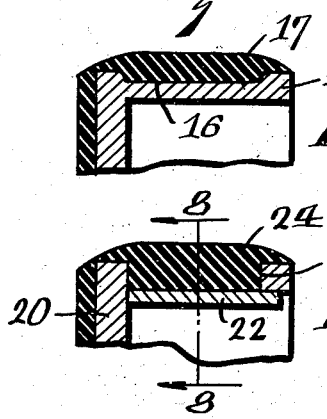
Inventor:
Joseph Armand Bombardier
By Albert Jauvin
Attorney Patented May 1, 1945

2,374,644

UNITED STATES PATENT OFFICE 2,374,644

SPROCKET WHEEL

Joseph Armand Bombardier, Valcourt, Quebec, Canada

Application July 10, 1943, Serial No. 494,146

2 Claims. (Cl. 74—243)

The present invention pertains to a novel sprocket wheel with resilient pads and a method of applying such pads.

In chain and sprocket drives, there is frequently clashing of transverse parts of the chain in the troughs of the sprocket. It has been proposed to rivet rubber pads in the troughs but this method has proved unsatisfactory.

One of the objects of this invention is to fasten the pads more securely and in a simpler manner. The entire peripheral wall and other surfaces of the sprocket are coated with adhesive rubber by spraying, painting, vulcanizing or the like. The rubber is then removed from the non-wearing parts of the wheel periphery in such a manner as to leave a pad in each trough.

In a track-laying snow vehicle, one of the functions of the pads is to expel snow and ice packed in the troughs by the track.

In another variant of the invention for this function, each trough may be formed with an opening therethrough, with no pad. The snow and ice merely drop through the opening and so cannot pack.

The invention is fully disclosed by way of example in the following description and in the accompanying drawing in which:

Figure 1 is a longitudinal section of a sprocket coated with rubber;

Figure 2 is an end view thereof;

Figure 3 is a detail perspective view of the finished sprocket;

Figure 4 is a cross section thereof with the chain applied;

Figure 5 is a detail section of Figure 4;

Figure 6 is a detail section of a modification;

Figure 7 is a detail section of another modification; and

Figure 8 is a section on the line 8—8 of Figure 7.

Reference to these views will now be made by use of like characters which are employed to designate corresponding parts throughout.

As shown in Figure 1, the sprocket is a double ended construction comprising two sleeves or hubs 1 with a sprocket wheel 2 at one end of each. The remaining end of each hub is flanged inward at 3, and the flanges are bolted together at 4. Each sprocket wheel includes, as usual, spaced teeth 5 and intervening concave troughs 6.

Figure 4 shows the relation of the sprocket to a vehicle track driven thereby. The track consists of a pair of spaced endless bands 7 joined by spaced straps 8 secured thereto. The straps are concaved outwardly and are received in the troughs of the sprockets, with the teeth entering between the straps, whereby the track is driven. It is desirable to attach rubber to the troughs, and Figure 4 illustrates how the rubber will be worn away at the edge 9 if not properly shaped. Hitherto, rubber pads have been riveted in the troughs, but the pads have worked loose in a comparatively short length of time.

According to the invention, the assembled sprocket is first given a complete coating 10 of rubber. The coating may be applied by any suitable method causing it to adhere to the metal, such as spraying, painting or vulcanizing. Inasmuch as the rubber is desired only in the wearing parts or troughs of the sprocket wheels, it is removed from the other parts in such a manner as to leave oval pads 11 in the troughs. Moreover, the pads may be spaced at 12 from the edges of the wheel and are formed with bevelled edges 13.

The pad results in silent contact with the track, as well as a resilient contact. Also, any snow or ice that packs between the pad and the track is sprung out by the resilient action of the rubber.

In the modification shown in Figure 6, the wheel 15 is formed with a cavity 16 where the rubber pad 17 is to be retained. The pad is thus anchored more firmly, and a thicker pad becomes possible by virtue of the cavity.

Similar results are obtained by the construction shown in Figure 7 wherein each trough of the sprocket 20 is formed with a slot or opening 21 in its bottom. This opening need not be filled, in which case it is a relief passage preventing accumulation of snow and ice.

A rubber pad may however, be applied after fastening a plate 22 beneath the opening by means of bolts 23. Rubber 24 is then applied and trimmed in the manner already described.

Although specific embodiments of the invention have been illustrated and described, it will be understood that various alterations in the details of construction may be made without departing from the scope of the invention as indicated by the appended claims.

What I claim as my invention is:

1. In a sprocket wheel having spaced teeth and intervening troughs, each trough having an open bottom, a plate secured beneath said open bottom, and a pad or rubber filling said open bottom.

2. The method of padding a sprocket wheel consisting in coating the peripheral wall of said wheel with adhesive rubber and subsequently removing the rubber from the crowns and side walls to the teeth, whereby to leave pads extending outwardly beyond the normal surfaces of the troughs, and bevelling the edges of said pads along the concavities of the troughs.

JOSEPH ARMAND BOMBARDIER.